United States Patent [19]
Clark et al.

[11] Patent Number: 5,670,720
[45] Date of Patent: Sep. 23, 1997

[54] WIRE-WRAP LOW PRESSURE SENSOR FOR PRESSURIZED GAS INFLATORS

[75] Inventors: Marcus T. Clark, Kaysville; David D. Schroeder; David W. Parkinson, both of Ogden; Kelly B. Johnson, Layton; Brent R. Marchant, Ogden, all of Utah

[73] Assignee: Morton International, Inc., Chicago, Ill.

[21] Appl. No.: 584,903

[22] Filed: Jan. 11, 1996

[51] Int. Cl.⁶ .................. G01L 7/02; G01L 7/10
[52] U.S. Cl. ............................................. 73/730
[58] Field of Search .................. 73/493, 52, 729.2, 73/753, 230, 40.5

[56] References Cited

U.S. PATENT DOCUMENTS

| | | | |
|---|---|---|---|
| 2,185,971 | 1/1940 | Achtel | 73/729.2 |
| 2,326,771 | 8/1943 | Edison | 116/270 |
| 2,544,567 | 3/1951 | Rundell | 73/730 |
| 2,603,728 | 6/1952 | Melchoir | 73/729.2 |
| 2,634,721 | 4/1953 | Greenwood, Jr. | 73/730 |
| 3,345,876 | 10/1967 | Smith | 116/266 |
| 3,397,578 | 8/1968 | Klumb | 73/729.2 |
| 3,492,968 | 2/1970 | Workman, Jr. | 116/270 |
| 3,546,944 | 12/1970 | Mack | 116/266 |
| 3,555,903 | 1/1971 | Glassey | 73/729.2 |
| 3,771,121 | 11/1973 | Lohr | 340/52 R |
| 3,805,618 | 4/1974 | Csaposs et al. | 73/729.2 |
| 3,818,764 | 6/1974 | Wagner | 73/393 |
| 3,944,769 | 3/1976 | Wagner | 200/83 A |
| 4,049,935 | 9/1977 | Gruber | 200/83 P |
| 4,394,033 | 7/1983 | Goetz et al. | 280/736 |
| 4,706,501 | 11/1987 | Atkinson et al. | 73/730 |
| 5,225,643 | 7/1993 | Marchant | 200/834 |
| 5,296,659 | 3/1994 | Potts et al. | 200/83 J |
| 5,301,979 | 4/1994 | Allard | 280/737 |
| 5,351,527 | 10/1994 | Blackburn et al. | 73/52 |
| 5,356,176 | 10/1994 | Wells | 280/737 |
| 5,360,232 | 11/1994 | Lowe et al. | 280/741 |
| 5,360,331 | 11/1994 | Wareham | 73/730 |
| 5,429,387 | 7/1995 | Clark et al. | 280/737 |

FOREIGN PATENT DOCUMENTS

406018357 A  1/1994  Japan .................. 73/49.3

Primary Examiner—George M. Dombroske
Assistant Examiner—William L. Oen
Attorney, Agent, or Firm—Corinne R. Gorski; Gerald K. White

[57] ABSTRACT

A low pressure sensing device for sensing pressure changes in a pressurized gas storage bottle of an inflater. At least one wire is wrapped around the vessel to sense the expansion or contraction of the vessel due to pressure changes in the vessel. The wire has a first end and a second end. The first end of the wire is secured to the vessel and the remainder of the wire is free to move circumferentially relative to the vessel in response to the expansion and contraction of the vessel. This relative movement can be monitored to determine if a pressure change has occurred in the vessel.

16 Claims, 3 Drawing Sheets

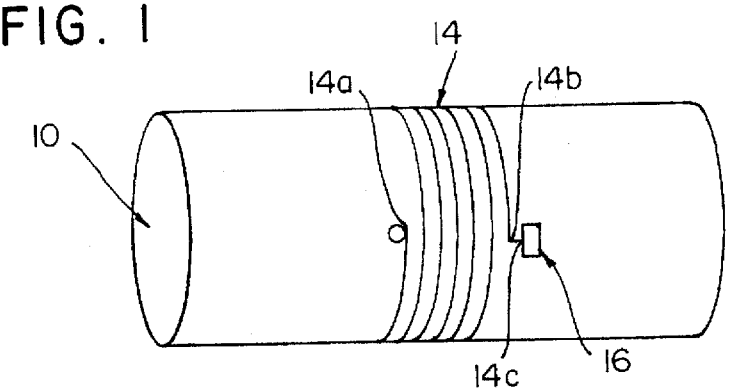
FIG. 1
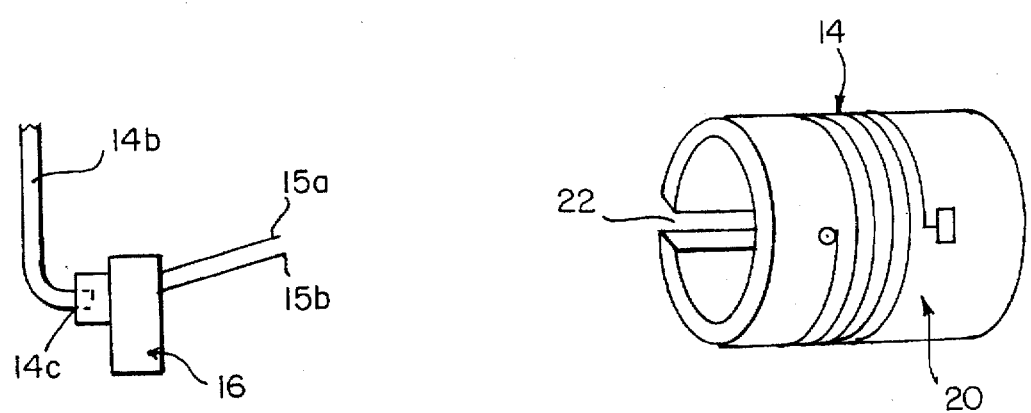
FIG. 2
FIG. 3
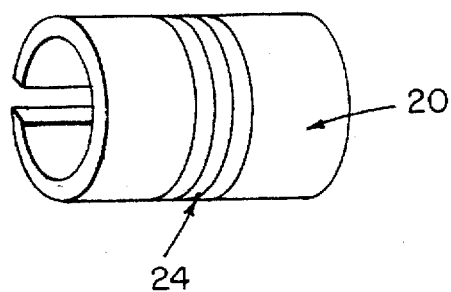
FIG. 4

WIRE-WRAP LOW PRESSURE SENSOR FOR PRESSURIZED GAS INFLATORS

This application is related to copending application Ser. No. 08/600,844, entitled "Tell-Tale Indicator to Provide Evidence of Gas in an Inflator at the Time of Deployment"; Ser. No. 08/587,615, entitled "Post Deployment Fill Status Indicator"; Ser. No. 08/648,459, entitled "Device for Pressure Release During Bonfire and Tell-Tale of Compressed Gas", Ser. No. 08/558,358, entitled "Temperature Adjusting Low Pressure Sensor.

BACKGROUND OF THE INVENTION

1. Field of the Invention

The present invention relates to a wire-wrap low pressure sensing device for sensing pressure changes of a vessel, and more particularly, to a low pressure sensing device for detecting pressure changes in an inflater of a vehicle safety restraint system.

2. Description of the Related Art

Numerous types of inflators have been disclosed in the prior art for expanding an inflatable air bag of a vehicle safety restraint system. One type of inflator, as disclosed in U.S. Pat. No. 5,301,979, assigned to the assignee of the present invention, utilizes a quantity of high pressure gas stored in a storage cylinder or body, which is selectively released to inflate the air bag. Another type of inflator derives the gas source from a combustible gas generating material, which, upon ignition, generates a quantity of hot gas for inflating the air bag. In still another type, the inflator includes both stored compressed gas and gas generating material for inflating the air bag. Such an inflator is referred to as a hybrid inflator, an example of which is disclosed in U.S. Pat. No. 5,360,232, assigned to the assignee of the present invention.

In a vehicle safety restraint system which partly or solely utilizes stored compressed gas it is very important to monitor the pressurized bottle containing the stored gas to detect any leakage in the container. If the gas pressure of the bottle falls below a predetermined level due to an undetected gas leak, the airbag effectiveness would degrade and the system will not operate properly.

It is known to detect loss of pressure in a pressurized vessel, with such loss being attributed to a leak in the vessel or other damage to the vessel. See U.S. Pat. Nos. 3,771,121, 4,049,935 and 5,296,659. U.S. Pat. No. 5,225,643, assigned to the assignee of the present invention, discloses a differential pressure switch disposed within a pressurized vessel.

U.S. Pat. Nos. 3,818,764 and 3,944,769 disclose pressure sensors which are temperature compensated by charging the sensor reference chambers with the same gas as the inflator. Thus, the switch must be pressurized and this pressurized gas may also leak. Moreover, continuous adjustment of the pressure is required.

U.S. Pat. No. 5,356,176 discloses a complex leakage detecting assembly which generates a signal in response to a change in temperature of the vessel through the use of a plurality of strain gauges and a layered bimetallic disk.

One disadvantage with such intrusive sensing devices is the need for high pressure insulative seals through which to monitor the device. The vessel intrusive switches add leak paths to the inflator hermetic seals and are relatively complex.

SUMMARY OF THE INVENTION

It is an object of the present invention to provide a low pressure sensor for a pressurized gas inflator which is not contained within the bottle, and a pressure sensor without the need for costly and labor-intensive seals associated with such intrusive pressure sensors.

The present invention overcomes the deficiencies of the prior art by providing a device for sensing pressure changes in a pressurized gas storage bottle of an inflator. Sensing means wrapped around the vessel sense expansion or contraction of the vessel due to pressure changes in the vessel. The sensing means has a first end and a second end. The first end of the sensing means is secured to the vessel and the remainder of the sensing means is free to move circumferentially with respect to the vessel in response to the expansion and contraction of the vessel. Means for determining the positional change of the sensing means determine if a pressure change has occurred in the vessel.

In one embodiment, the sensing means comprises a wire wrapped a plurality of times around an outer diameter of the vessel. In another embodiment, a pair of wires are wrapped around the vessel. The free end of the wire(s) communicates with a switch which responds to the positional change of the wire by making or breaking continuity.

In still another embodiment, the sensing means comprises a carbon fiber wrapped around the vessel.

Other features and advantages of the present invention will become apparent from the following description of the invention which refers to the accompanying drawings.

BRIEF DESCRIPTION OF THE DRAWINGS

FIG. 1 is a perspective view of a first embodiment of the low pressure sensor of the present invention.

FIG. 2 is an enlarged detail of the switch engagement mechanism of embodiment of FIG. 1.

FIG. 3 is a perspective view of another embodiment of the low pressure sensor of the present invention.

FIG. 4 is a perspective view of the core of the embodiment of FIG. 3.

DETAILED DESCRIPTION OF THE PREFERRED EMBODIMENTS

Figure 5:
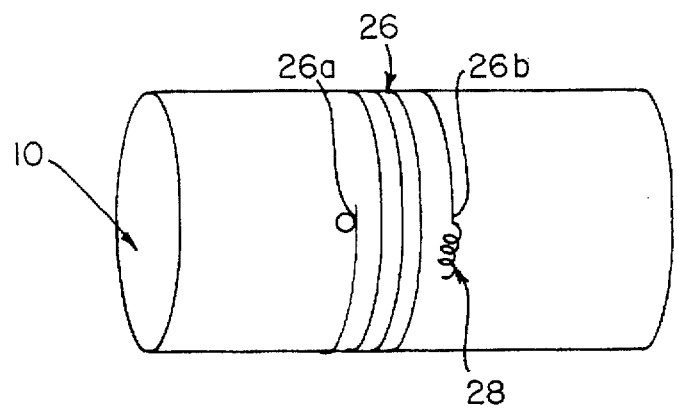
FIG. 5 is a perspective view of a third embodiment of the low pressure sensor of the present invention.

A cylindrical pressure vessel inherently grows and shrinks as its internal pressure changes. As disclosed by the present invention, this movement can be utilized to determine whether the pressure in the bottle is sufficient by correlating the growth of the diameter of the cylinder with the internal pressure. However, since the growth is typically very small, it is desirable to multiply the effect of diameter growth by wrapping the bottle numerous times with a means, such as a wire, while minimizing the friction between the bottle and the wire. With one end of the wire secured to the bottle and the other end of the wire being allowed to move, the position of the free end of the wire can be observed to predict bottle pressure changes.

Thermal changes will cause the bottle diameter to change due to pressure increase and thermal expansion of the bottle material. These can be negated by choosing wire which has the appropriate thermal characteristics to offset these effects. This is important to allow the detection of only leak-caused pressure changes, which is the desired detection mode, and to avoid having the wire continually sliding against the bottle with temperature fluctuations, causing wear of the wire.

In one embodiment, as illustrated in FIG. 1, a coil of wire 14 is wrapped tightly around a pressure vessel, herein a gas storage bottle 10 of an inflator. Bottle 10 is filled and pressurized with an inert gas, such as argon or nitrogen, to a pressure typically in the range of 2000 to 4000 psi. The gas storage bottle 10 is made of a flexible material, such as steel, which expands and contracts elastically in the pressure range for which it was designed. The bottle can have a wall thickness in the range of, for example, 0.080 in. to 0.120 in.

The wire 14 is wound directly onto the bottle numerous times. In order to maintain close proximity between the wire and the bottle, the wire can be pre-coiled to a slightly smaller diameter than the bottle, then slipped over the bottle, to maintain positive tension therebetween. The wire 14 could be a bare wire or could be insulated with a very thin, hard layer of insulation.

As shown in FIG. 1, wire 14 includes a first and second end, 14a, 14b, respectively. End 14a is secured to the bottle to prevent movement of the wire end relative to the bottle. End 14a may be wrapped about a post or bonded to the surface of bottle 10 by welding, adhesion, or other equivalent attachment means.

The remaining portion of wire 14, including the other end 14b, is free to move circumferentially relative to the bottle 10. However, it is desirable to keep friction between the wire coils and the bottle to a minimum. Any wire cross-section can be utilized to assist in this, along with any friction reducing compounds, such as oil or graphite.

As the inflator is filled with pressurized gas, the bottle expands, and the diameter of the wire coils expands correspondingly in an elastic manner. Assuming minimal stretching of the wire, this elastic diameter change translates to a positional change in free end 14b relative to a fixed point on the bottle.

Referring to FIGS. 1 and 2, an electrical contact mechanism includes free end 14b and an adjacent switch 16 fixed on the bottle. Free end 14b terminates in a pointer 14c. The pointer 14c engages switch 16. Depending upon the position of pointer 14c, which is determined by the diameter of the bottle, switch 16 is opened or closed. Electrical lead wires 15a and 15b extending from switch 16 are connected to a monitoring circuit (not shown) to determine the continuity of the switch. The reaction canister in which the inflator bottle 10 is located after assembly could be provided with a closely toleranced hole (not shown) to accommodate switch 16 and wires 15, reducing assembly costs by having to avoid routing the wires away from the reaction can.

In a normal operating state of the inflator, the pointer 14c causes the switch 16 to close. If the pressure in bottle 10 drops too low, pointer 14c will force switch 16 to open, and the monitor circuit will detect an open condition. The circuit continuity could be monitored continuously by a monitor circuit located in the vehicle. Relative movement between of free end 14b can also be monitored visually, such as during servicing, by determining the position of pointer 14c with respect to a fixed point on the vessel.

Additionally, switch 16 can be designed to detect overpressure conditions, for example, during manufacture, such that pointer 14c keeps switch 16 open until the pressure within bottle 10 drops to the correct range.

Referring to FIG. 3, in another embodiment of the invention, a wire coil 14 is wrapped onto a core 20 of ceramic, or some other hard material. The core is cylindrical to fit snugly over the bottle, and can be fit on the bottle before or after filling. The core is cut length-wise to provide an expansion gap 22, similar to a piston ring, to allow the core diameter to expand with expansion of the bottle. Once the core 20 is positioned on bottle 10, it functions in the same manner as the above-described embodiment.

As shown in FIG. 4, the core 20 could include smooth thread-like grooves 24 for holding and separating the turns of the wire as it is wound onto the core.

In still another embodiment, as illustrated in FIG. 5, the wire is made from a fiber, such as a carbon fiber 26, that is wrapped around the bottle with one end 26a being secured thereto. An other end 26b is attached to a spring 28, or other similar means, to maintain tension on the fiber, while keeping the fiber in close proximity to the bottle. The free end 26b of the wire includes a contact mechanism which operates in the same manner as the embodiment described above.

Figure 6:
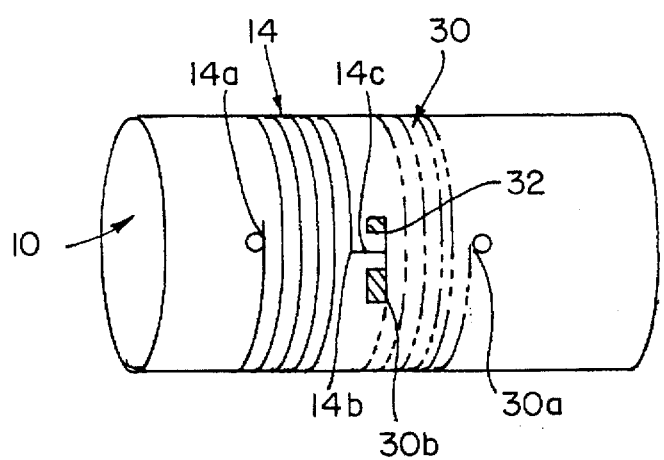
FIG. 6 is a perspective view of another embodiment of the low pressure sensor of the present invention.

Referring to FIG. 6, another embodiment of the low pressure switch of the present invention includes wire 14 and a second wire 30 wrapped around bottle 10. As described above, end 14b of wire 14 includes a pointer 14c, where convenient, like terms have been used to describe like elements. Pointer 14c communicates with a switch 32, which will be described further herein.

Wire 30 includes a first end 30a fixed to the surface of bottle 10 and a second end 30b attached to switch 32. As the diameter of bottle 10 changes the wire ends 14b and 30b move circumferentially relative to bottle 10 and each other.

Figure 7:
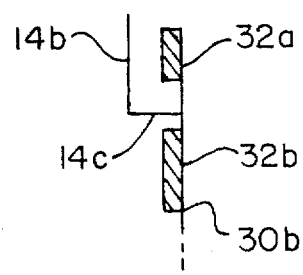
FIG. 7 is an enlarged detail of the switch mechanism of the embodiment of FIG. 6.

FIG. 7 further illustrates contact between the free ends 14b, 30b of the wires. Free end 14b is connected to the bare contact area of contact 32. The free end 30b of wire 30 is connected to an insulated arm 32b. A second insulated arm 32a bridges the bare contact area of switch 32. As pressure in the bottle decreases, due to leaks, the wire coils shrink elastically back to a smaller diameter and the free ends make or break contact as desired to indicate that a pressure loss has occurred. For example, if pointer 14c comes into contact with arm 32a or 32b, the switch will open or close, depending on its initial setting.

Figure 8:
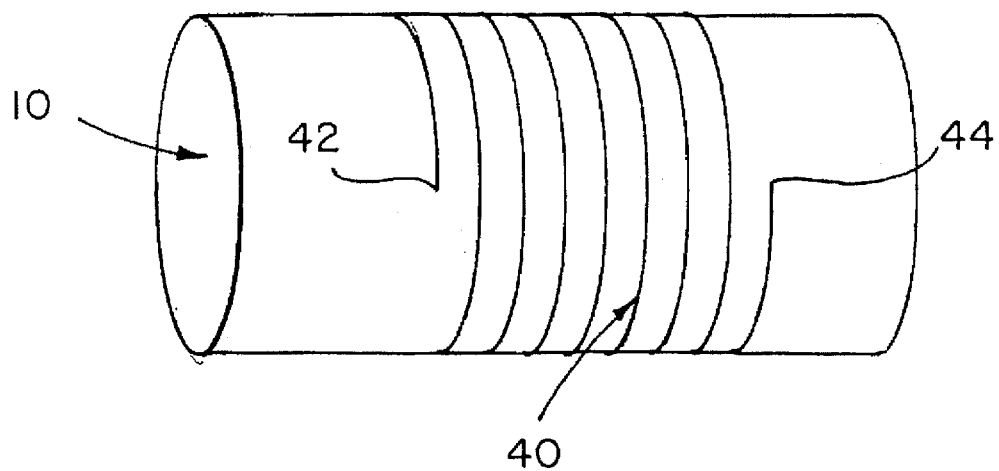
FIG. 8 is a perspective view of a fifth embodiment of the low pressure sensor of the present invention.

In the embodiment of FIG. 8, the inflator bottle 10 is wrapped with a single insulated resistive wire 40, having a very small diameter, for example, 5000th of an inch. The wire 40 has opposed ends 42, 44 which are secured to the bottle 10. As the inflator is filled with pressurized gas, the bottle expands and the wire 40 stretches elastically, increasing the resistance value measured at the wire ends 42, 44 with leads connected to a monitor (not shown).

A single wrap or multiple wraps of the wire can be used. Wrapping the wire around the bottle many times amplifies the effect of the minimal change in bottle diameter growth, each turn changes the resistance slightly, and added together the wire turns provide a large resistance change. The resistance value is correlated with pressure existent in the bottle. As pressure in the bottle drops, due to a leak, the wire coils shrink elastically back to a smaller diameter and the resistance drops correspondingly. The resistance can be monitored continuously by a monitor circuit in the vehicle, or it may be checked periodically during servicing. If necessary, a reference resistance, such as a bridge circuit, may be included in the wire circuit to better discriminate resistance changes.

As with the previous embodiments, thermally caused pressure changes can be compensated for by selecting a wire whose thermal expansion characteristics are such that they negate temperature related bottle diameter changes. This is important to avoid having the wire continually stretching with temperature fluctuations, tending to wear away the insulation.

The wire 40 is insulated with a very thin layer of hard insulation and wrapped directly onto the bottle. The insulation used is non-flexible so that it does not flex and absorb the changes in the bottle diameter. Alternately, the bottle could be coated with a layer of hard insulative material and the bare wire wrapped directly over the coated bottle.

Figure 9:
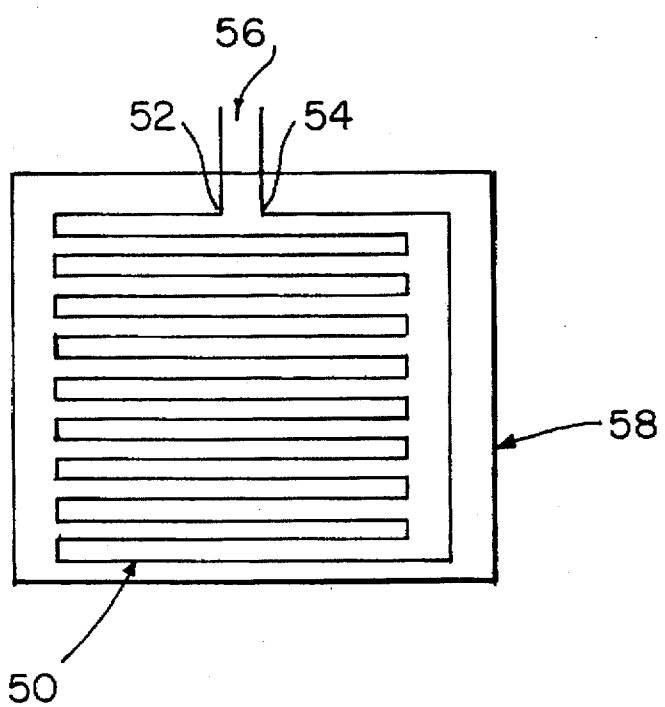
FIG. 9 is a top view of a wire/substrate assembly of a sixth embodiment of the low pressure sensor of the present invention.

In the embodiment of FIG. 9, a resistive wire 50 is printed onto a thin sheet of substrate 58, for example, mylar, in a back and forth pattern. The substrate sheet is then wrapped around the bottle, such that the wire is on the inside surface, and the ends of the sheet are welded together to secure the sheet tightly to the bottle. The entire sheet, including the imprinted wire, would expand and contract with the bottle. Ends 52, 54 of the wire can be attached to leads 56 to monitor the changes, as described above with reference to the other embodiments of the present invention.

A test device, used to test the status of the sensor periodically, can provide a "yes/no" indication for a technician.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A low pressure sensing device for sensing pressure changes of a pressurized vessel, comprising:

sensing means wrapped around the vessel for sensing expansion or contraction of the vessel due to pressure changes in the vessel, said sensing means comprising at least one wire wrapped about an outer diameter of the vessel, said at least one wire having a first end and a second end, said first end of said at least one wire being secured to the vessel and the second end and remainder of said at least one wire being free to move circumferentially with respect to the vessel in response to the expansion and contraction of the vessel; and means for determining the positional change of said sensing means to determine if a pressure change has occurred in the vessel.

2. The low pressure sensing device of claim 1, wherein said first end of said wire includes a pointer which moves circumferentially in response to the expansion and contraction of the vessel.

3. The low pressure sensing device of claim 2, wherein said determining means comprises a switch disposed on the vessel and said pointer engages said switch, wherein the movement of said pointer relative to said switch operates said switch, said switch being monitored by an external circuit.

4. The low pressure sensing device of claim 2, wherein said pointer can be visually inspected to determine its position relative to a fixed point on the vessel.

5. A low pressure sensing device for sensing pressure changes of a pressurized vessel, comprising:

sensing means wrapped around the vessel for sensing expansion or contraction of the vessel due to pressure changes in the vessel, said sensing means comprising a carbon fiber wrapped about an outer diameter of the vessel, said carbon fiber having a first end and a second end, said first end of said carbon fiber being secured to the vessel and the second end and remainder of said carbon fiber being free to move circumferentially with respect to the vessel in response to the expansion and contraction of the vessel; and means for determining the positional change of the carbon fiber to determine if a pressure change has occurred in the vessel.

6. The low pressure sensing device of claim 1, further comprising a core disposed over an outer diameter of the vessel, said at least one wire being wrapped numerous times around said core.

7. The low pressure sensing device of claim 6, wherein said core is made of ceramic.

8. The low pressure sensing device of claim 6, wherein said core includes an expansion gap disposed along a length thereof to allow the core to expand and contract with the expansion and contraction of the vessel.

9. The low pressure sensing device of claim 6, wherein said core includes means for securing said at least one wire thereto.

10. The low pressure sensing device of claim 9, wherein said securing means comprises a groove in said core for receiving said at least one wire.

11. The low pressure sensing device of claim 1, wherein said sensing means comprises a pair of wires wrapped around said vessel, each of said wires having a first and second end, each first end of said wires being secured to the vessel, and each said second end of said wires being free to move circumferentially with respect to the vessel and each other.

12. The low pressure sensing device of claim 11, wherein said determining means comprises a switch disposed on the vessel, and each said second end of said pair of wires communicates with said switch.

13. The low pressure sensing device of claim 1, wherein said at least one wire is printed on a sheet of substrate, said sheet being wrapped around an outer diameter of said vessel and secured thereto.

14. The low pressure sensing device of claim 1, wherein the vessel is a gas storage bottle of an inflator of a vehicle safety restraint system.

15. A method for sensing pressure changes in a gas storage bottle of an inflator of a vehicle safety restraint system, comprising the steps of:

wrapping a sensing means around an outer diameter of said bottle, said sensing means having a first end and a second end;

securing the first end of said sensing means to said bottle;

allowing said second end and the remainder of the sensing means to move circumferentially with respect to said bottle as the bottle contracts and expands due to pressure changes; and monitoring the movement of said second end of the sensing means to determine if a pressure change has occurred in the gas storage bottle.

16. The method of claim 15, wherein the step of monitoring the movement of said second end of said sensing means comprises engaging and actuating a switch disposed on the vessel with said second end, and monitoring the continuity of said switch with an external monitor.

* * * * *